US008886838B2

(12) United States Patent
Tripathi et al.

(10) Patent No.: US 8,886,838 B2
(45) Date of Patent: Nov. 11, 2014

(54) METHOD AND SYSTEM FOR TRANSFERRING PACKETS TO A GUEST OPERATING SYSTEM

(75) Inventors: Sunay Tripathi, San Jose, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 1643 days.

(21) Appl. No.: 12/040,101

(22) Filed: Feb. 29, 2008

(65) Prior Publication Data
US 2009/0219935 A1 Sep. 3, 2009

(51) Int. Cl.
G06F 15/16 (2006.01)
H04L 12/46 (2006.01)

(52) U.S. Cl.
CPC .................................. *H04L 12/4641* (2013.01)
USPC ......................................................... 709/250

(58) Field of Classification Search
CPC ................................................... H04L 12/4641
USPC ......................................................... 709/250
See application file for complete search history.

(56) References Cited

U.S. PATENT DOCUMENTS

| 6,041,053 | A | 3/2000 | Douceur et al. |
| 6,070,219 | A | 5/2000 | McAlpine et al. |
| 6,163,539 | A | 12/2000 | Alexander et al. |
| 6,477,643 | B1 | 11/2002 | Vorbach et al. |
| 6,600,721 | B2 | 7/2003 | Edholm |
| 6,714,960 | B1 | 3/2004 | Bitar et al. |
| 6,757,731 | B1 | 6/2004 | Barnes et al. |
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 7,046,665 | B1 | 5/2006 | Walrand et al. |
| 7,177,311 | B1 | 2/2007 | Hussain et al. |
| 7,260,102 | B2 | 8/2007 | Mehrvar et al. |
| 7,313,142 | B2 | 12/2007 | Matsuo et al. |
| 7,502,884 | B1 * | 3/2009 | Shah et al. ..................... 710/316 |
| 7,620,955 | B1 * | 11/2009 | Nelson ......................... 719/312 |
| 2003/0037154 | A1 | 2/2003 | Poggio et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |

(Continued)

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

*Primary Examiner* — Luat Phung
*Assistant Examiner* — Saad A Waqas
(74) *Attorney, Agent, or Firm* — Osha Liang LLP

(57) ABSTRACT

In general, the invention relates to a method for transferring a packet. The method includes receiving the packet by a physical network interface, determining a virtual network interface card (VNIC) using a virtual switching table, where the VNIC is located on a computer operatively connected to the network express manager (NEM) via a chassis interconnect, and the VNIC is executing on a host operating system (OS) in the computer. The method further includes transferring the packet to a receive ring (RR) associated with the VNIC, wherein the RR is located on the NEM, providing the network express manager with a receive descriptor, transferring the packet to the guest OS memory using the receive descriptor, and notifying the guest OS that the packet is in the guest OS memory.

18 Claims, 8 Drawing Sheets

(56) References Cited

U.S. PATENT DOCUMENTS

| | | |
|---|---|---|
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |
| 2007/0101323 A1* | 5/2007 | Foley et al. ............... 718/1 |

OTHER PUBLICATIONS

Tripathi, S.; "CrossBow: Solaris Network Virtualization and Resource Control"; Crossbow Architectual Document, Nov. 21, 2006; 19 pages.

Nordmark, E. et al.; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

* cited by examiner

METHOD AND SYSTEM FOR TRANSFERRING PACKETS TO A GUEST OPERATING SYSTEM

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829, now U.S. Pat. No. 7,945,647 B2; "Method and System for Controlling Network Traffic In a Blade" with U.S. application Ser. No. 11/953,832, now U.S. Pat. No. 8,370,530 B2; "Method and System for Reconfiguring a Virtual Network Path" with U.S. application Ser. No. 11/953,837, now U.S. Pat. No. 7,984,123 B2; "Method and System for Enforcing Resource Constraints For Virtual Machines Across Migration" with U.S. application Ser. No. 11/953,839, now U.S. Pat. No. 7,962,587 B2; and "Method and System for Monitoring Virtual Wires" with U.S. application Ser. No. 11/953,842, now U.S. Pat. No. 8,086,739 B2.

The present application contains subject matter that may be related to the subject matter in the following U.S. applications filed on Feb. 29, 2008, and assigned to the assignee of the present application: "Method and System for Offloading Network Processing" with U.S. application Ser. No. 12/040,165, now U.S. Pat. No. 7,965,714 B2 and "Method and System for Media-Based Data Transfer" with U.S. application Ser. No. 12/040,105, now U.S. Pat. No. 7,970,951 B2.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method for transferring a packet. The method includes receiving the packet by a physical network interface, where the packet comprises a destination address, determining a virtual network interface card (VNIC) using the destination address and a virtual switching table (VST), where the VST is located on a network express manager (NEM), the VNIC is located on a computer operatively connected to the NEM via a chassis interconnect, and the VNIC is executing on a host operating system (OS) in the computer. The method further includes transferring the packet to a receive ring (RR) associated with the VNIC, where the RR is located on the NEM, determining, by the VNIC, that the packet is in the RR, providing the network express manager with a receive descriptor, where the receive descriptor is a pointer to a memory location in a guest OS memory associated with a guest OS executing on the host OS, transferring the packet to the guest OS memory using the receive descriptor, and notifying the guest OS that the packet is in the guest OS memory.

In general, in one aspect, the invention relates to a system. The system includes a computer including a host operating system (OS) executing a virtual network interface card (VNIC), host OS memory associated with the host OS, a guest OS executing on the host OS, and guest OS memory associated with the guest OS. The system further includes a network express manager (NEM) comprising a physical network interface, a virtual switching table (VST), a receive ring (RR) associated with the VNIC, a chassis interconnect configured to communicatively couple the computer and network express manager, where the NEM is configured to: receive the packet from the physical network interface, where the packet comprises a destination address, and transfer the packet to a receive ring (RR) associated with the VNIC using the destination address and the VRT, where the RR is located on the NEM. The host OS is configured to: determine that the packet is in the RR, provide the network express manager with a receive descriptor, where the receive descriptor is a pointer to a memory location in the guest OS memory. The NEM is further configured to transfer the packet to the guest OS memory using the receive descriptor. The host OS is further configured to notify the guest OS that the packet is in the guest OS memory.

In general, in one aspect, the invention relates to a computer readable medium including executable instructions for transferring a packet, where the executable instructions includes instructions to receive the packet by a physical network interface, where the packet comprises a destination address, determine a virtual network interface card (VNIC) using the destination address and a virtual switching table (VST), where the VST is located on a network express manager (NEM), the VNIC is located on a computer operatively connected to the NEM via a chassis interconnect, and the VNIC is executing on a host operating system (OS) in the computer, transfer the packet to a receive ring (RR) associated with the VNIC, where the RR is located on the NEM, determine, by the VNIC, that the packet is in the RR, provide the network express manager with a receive descriptor, where the receive descriptor is a pointer to a memory location in a guest OS memory associated with a guest OS executing on the host OS, transfer the packet to the guest OS memory using the receive descriptor, and notify the guest OS that the packet is in the guest OS memory.

Other aspects of the invention will be apparent from the following description and the appended claims.

DETAILED DESCRIPTION

Figure 1:
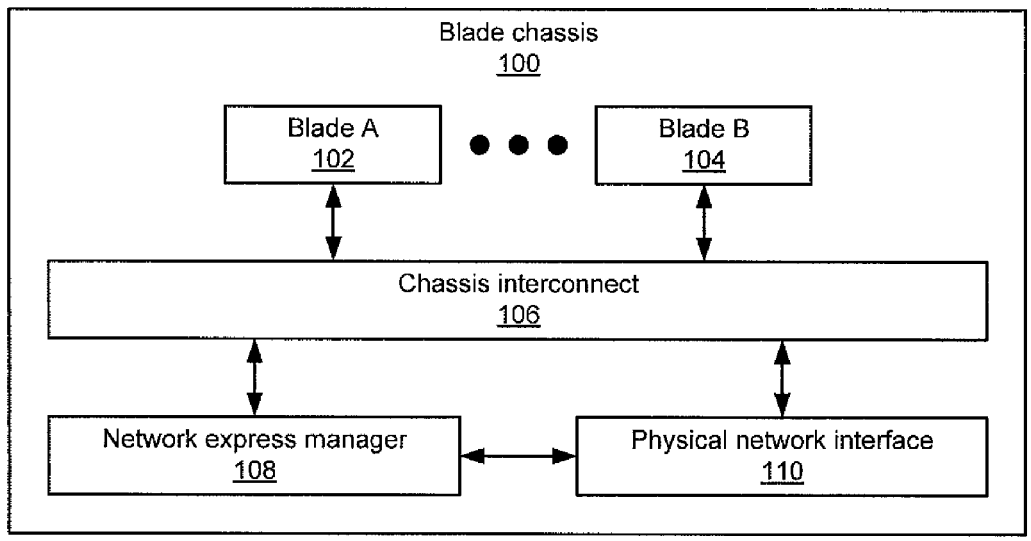
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for transferring data from a network express manager to a guest operating system (OS). More specifically, embodiments of the invention relate to a method and system for decreasing the processing overhead required to transfer packets from a receive ring in the network express manager to the guest OS.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
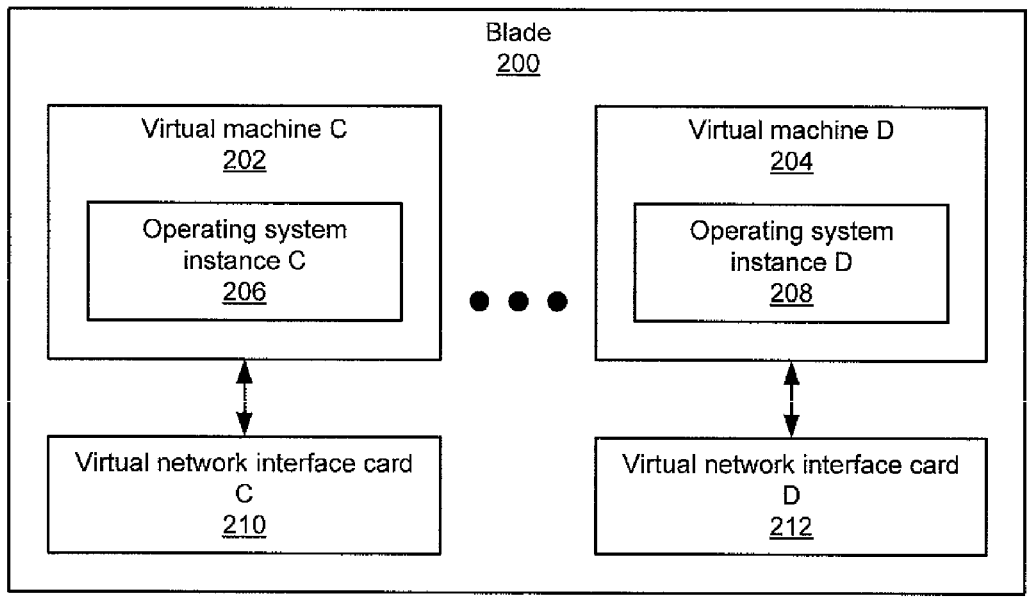
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
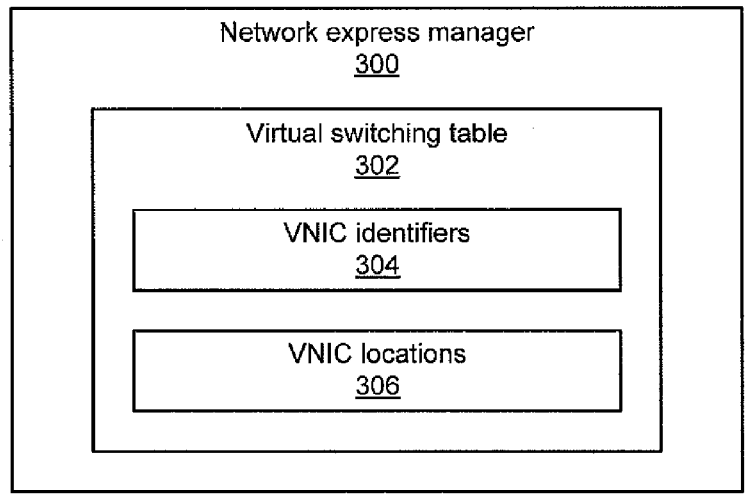
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another switching scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
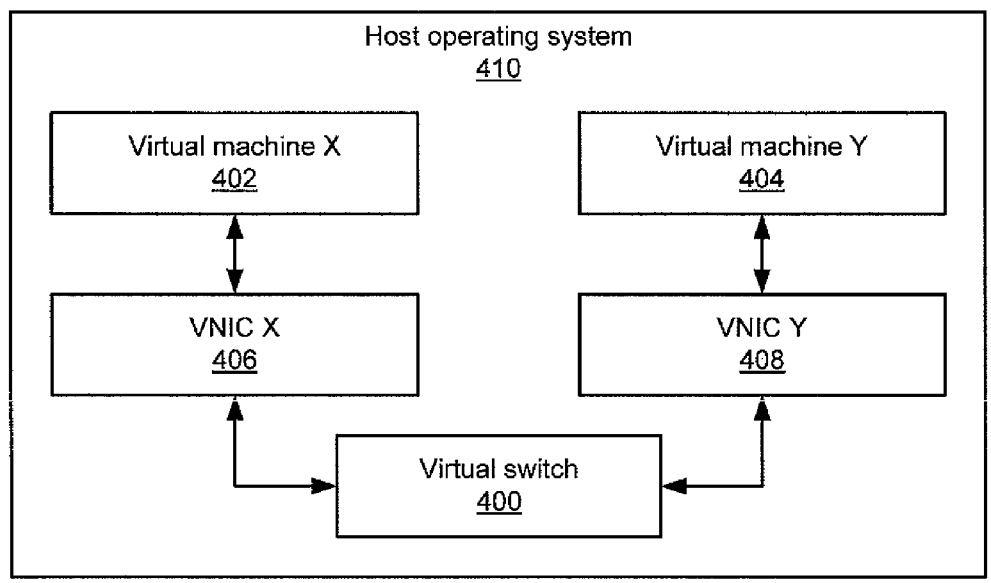
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
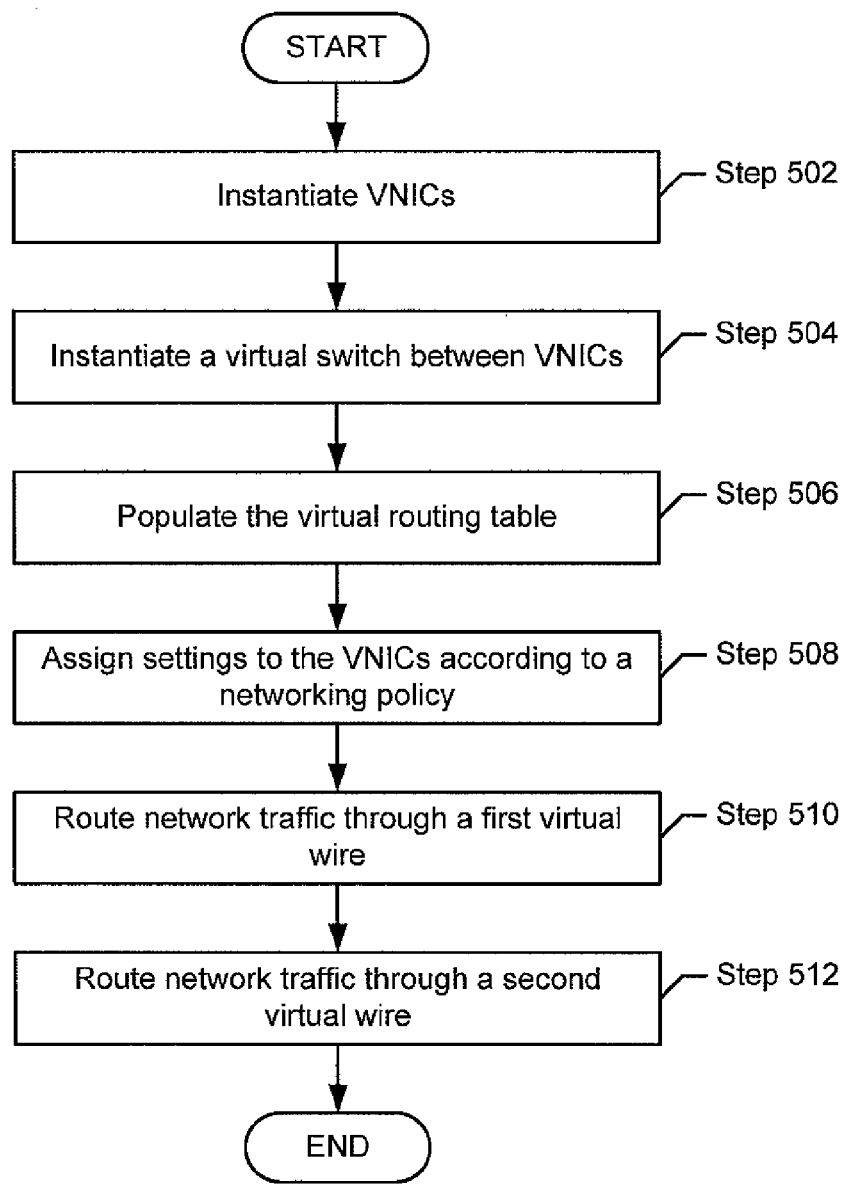
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, Internet Protocol and/or Media Access Control (MAC) addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves switching the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
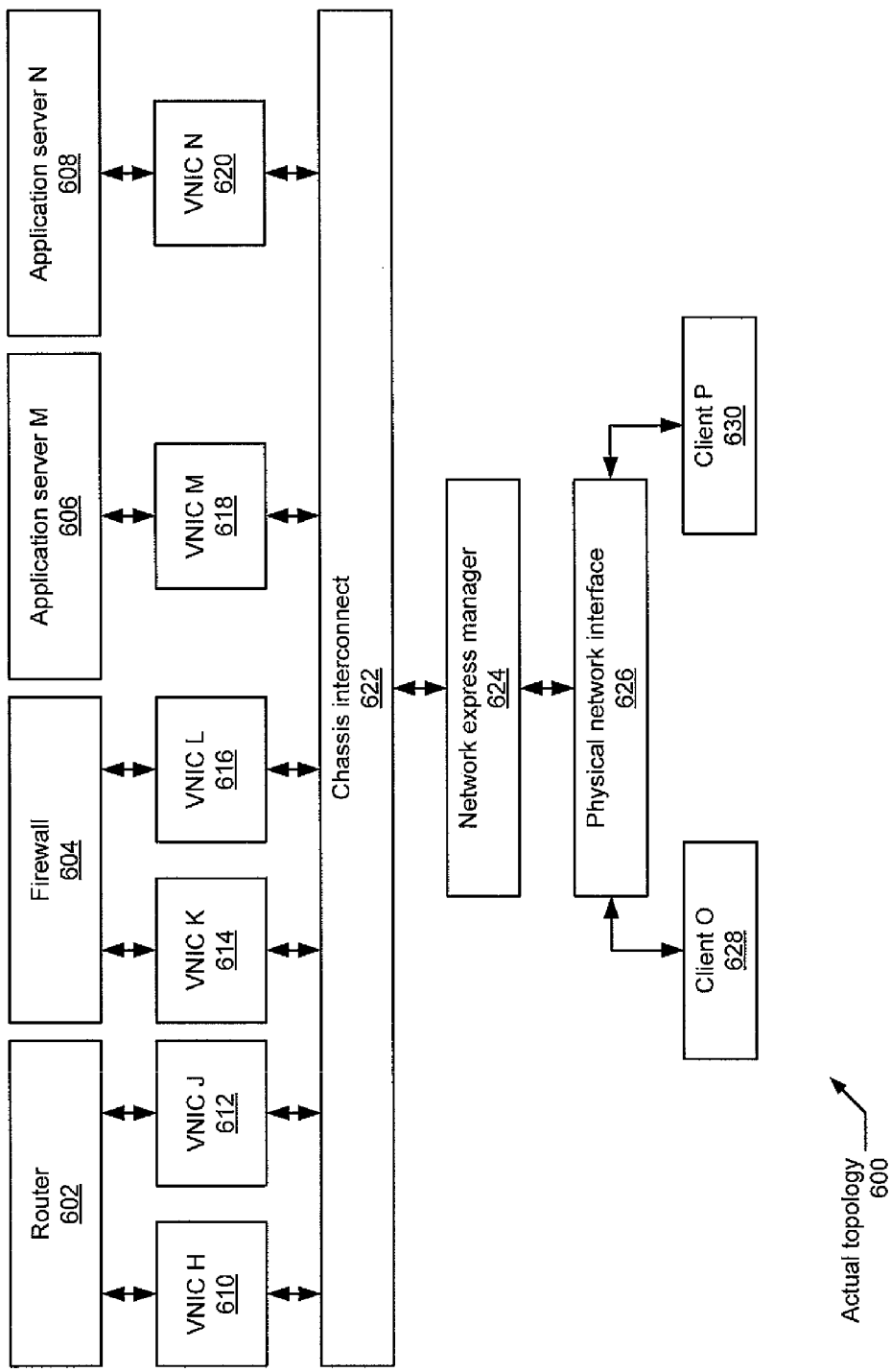
FIGS. 6A-6C show an example of creating virtual network paths in accordance with one or more embodiments of the invention.
Figure 6B:
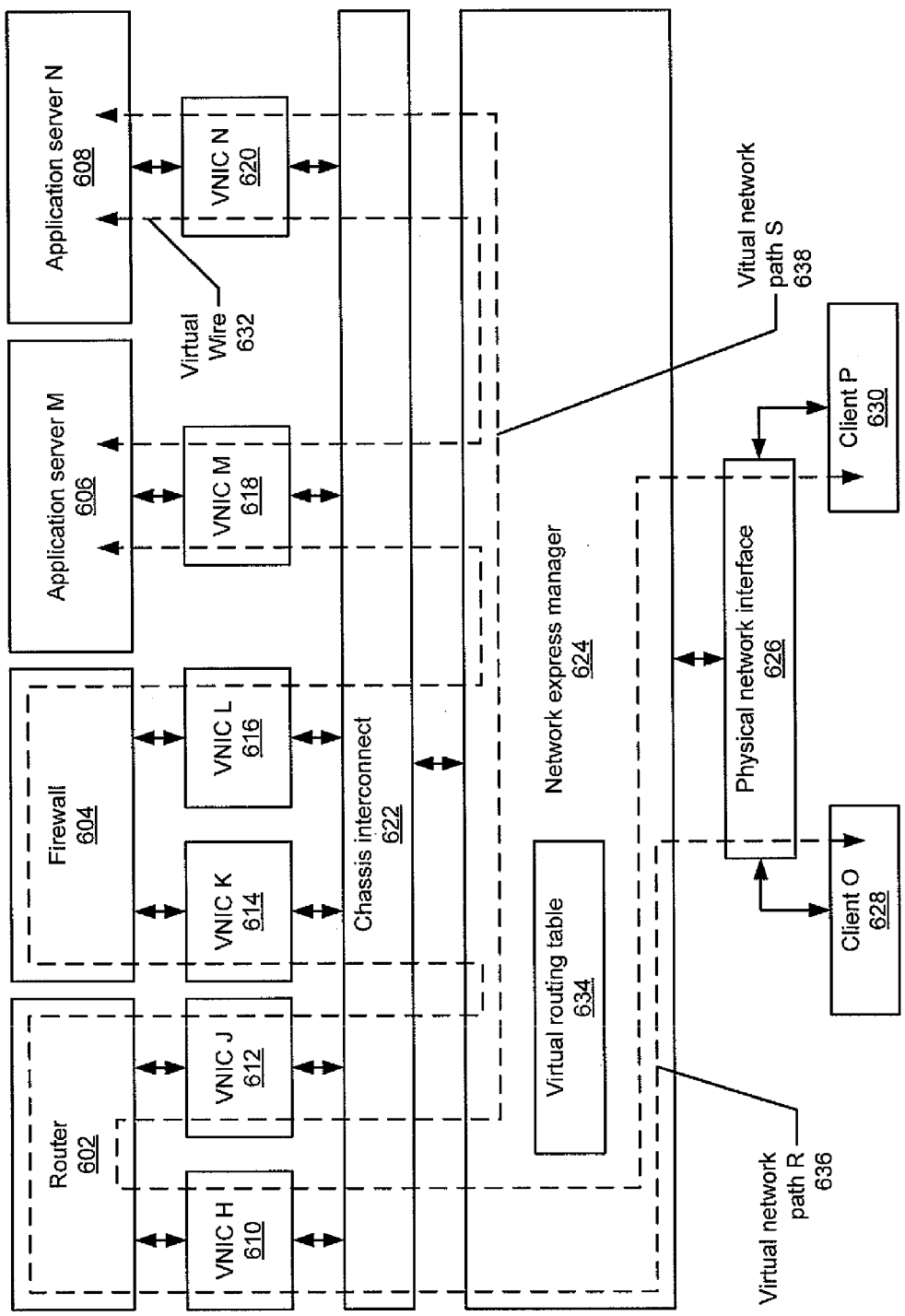
Figure 6C:
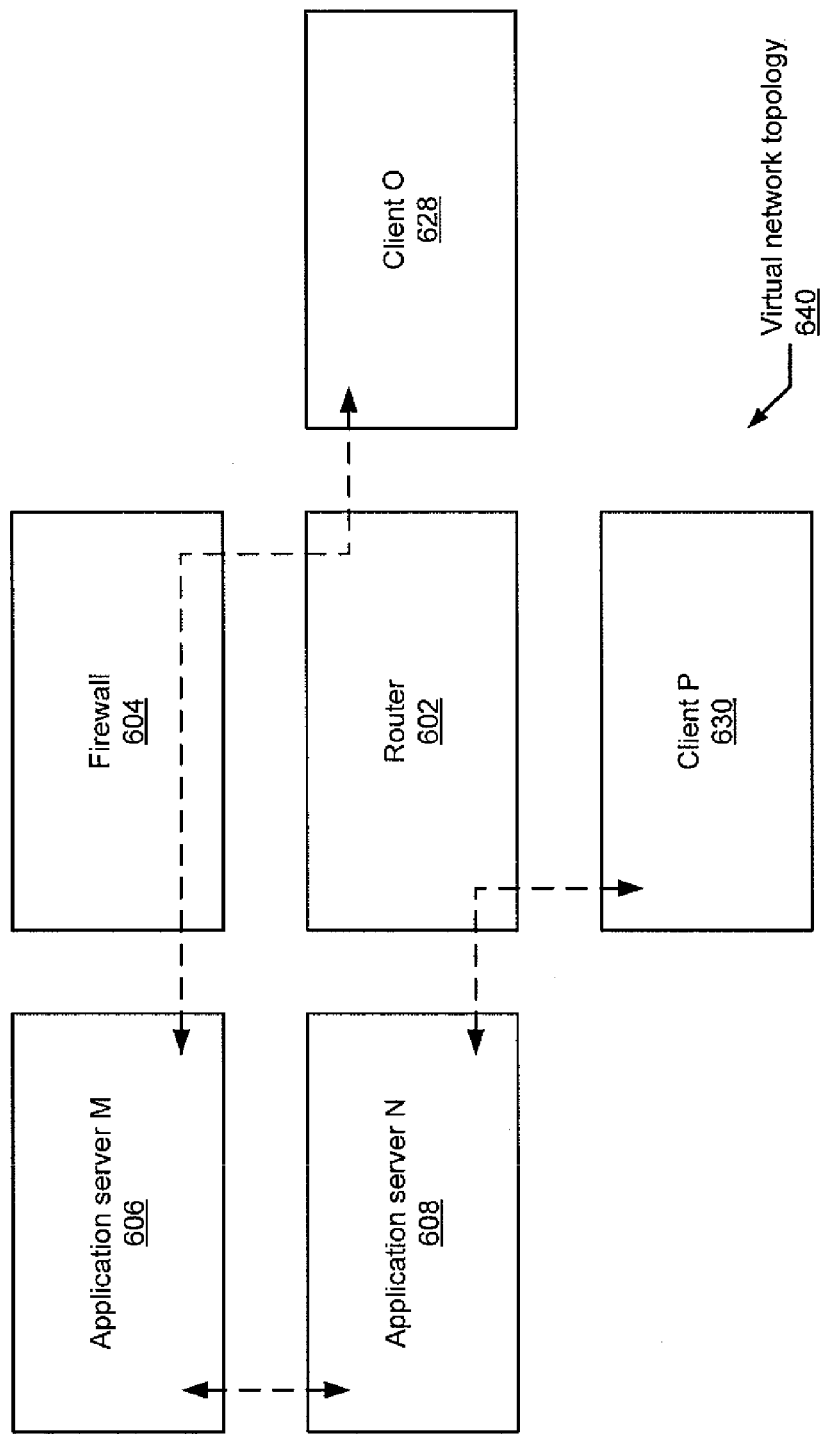

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by switching network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the switching is performed by the network express manager (624) using a virtual switching table (634).

As discussed above, network traffic routed to and from the VNICs may be though of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and switching network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

In one embodiment of the invention, packets in the network express manager (108 in FIG. 1) may be transferred to a guest OS (402 in FIG. 4) via a host OS (410 in FIG. 4) on which the guest OS is executing. In such cases, two packet transfers are required: (i) packets are transferred from the network express manager into the host OS memory; and (ii) packets are transferred from the host OS memory to the guest OS memory. Once the packets are in the guest OS memory, the guest OS memory may process the packets.

In another embodiment of the invention, packets may be transferred directly from the network express manager into the Guest OS memory. In this embodiment, the host OS maintains control over the transfer process (e.g., the host may enforce the rate at which packets are transferred from the network express manager to the guest OS memory) while not requiring the packets to be stored in the host OS memory. In one embodiment of the invention, by directly transferring the packets from the network express manager to the guest OS memory, the guest OS experiences a performance gain of 2-3 times as compared with transferring the packets to the host OS memory and then subsequently to the guest OS memory.

Figure 7:
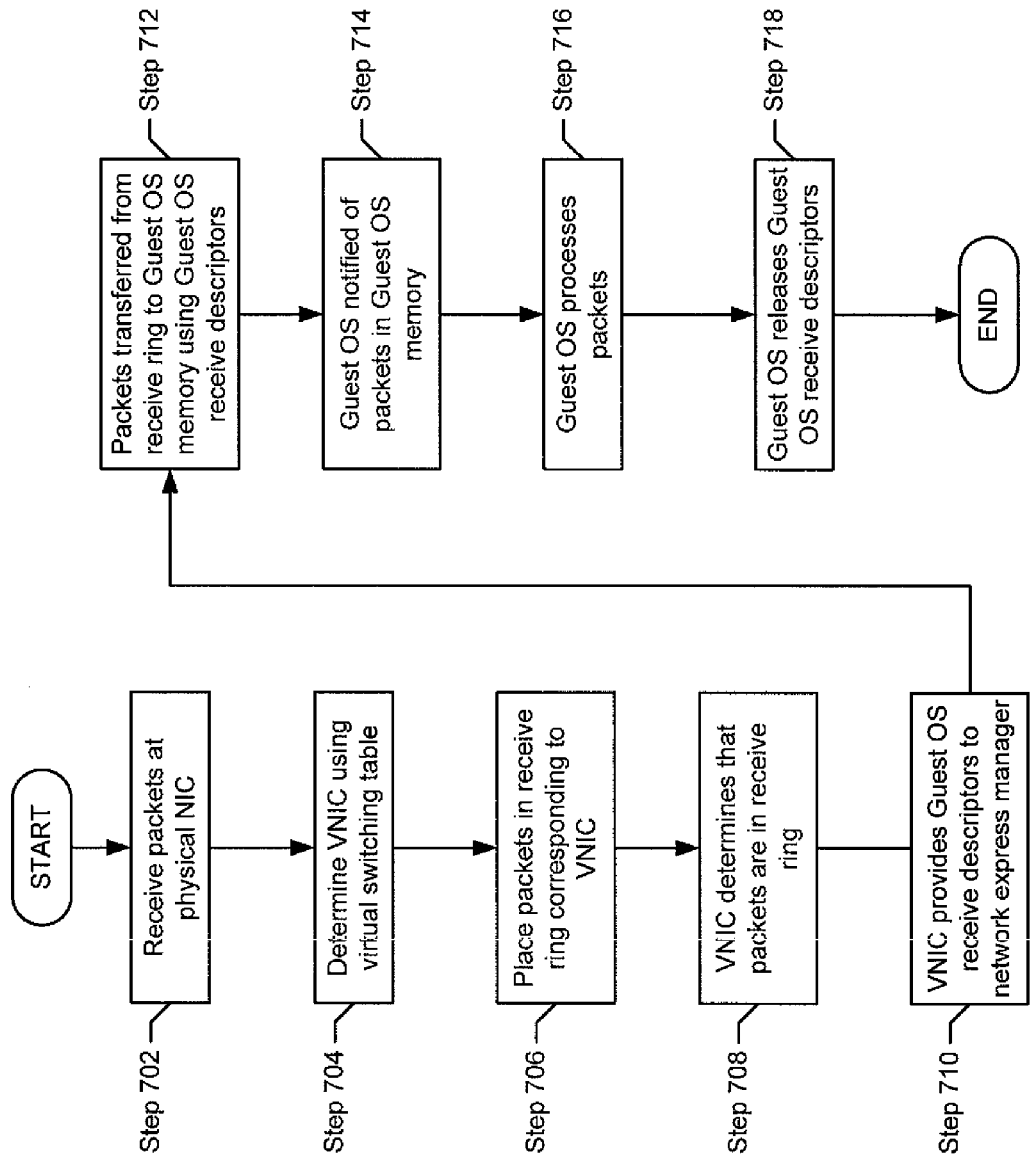
FIG. 7 shows a flowchart in accordance with one or more embodiments of the invention.
Figure 8:
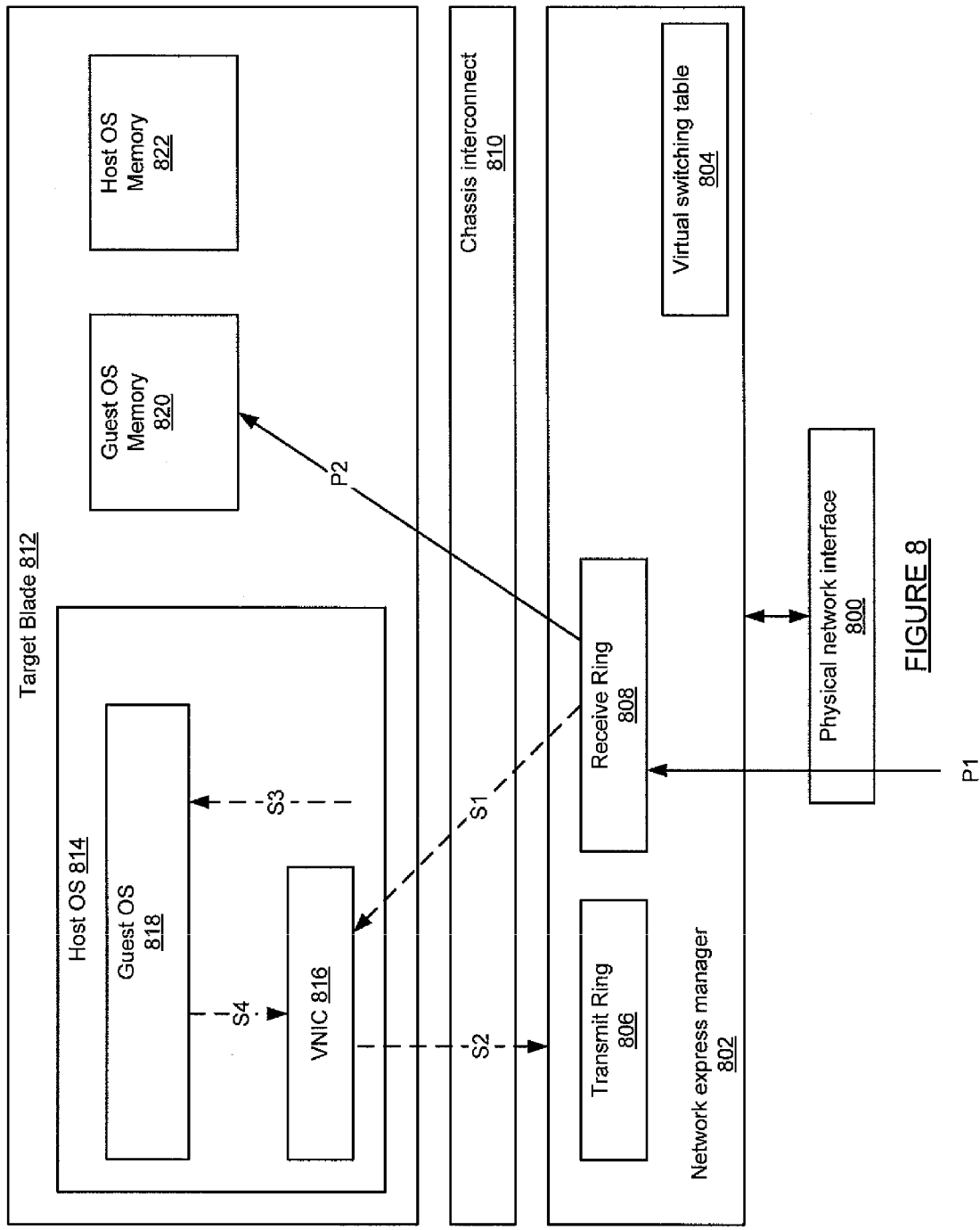
FIG. 8 shows an example in accordance with one or more embodiments of the invention.

FIGS. 7 and 8 describe a flowchart and an example, respectively, for transferring packets from the network express manager to the guest OS. Referring to FIG. 7, in one or more embodiments of the invention, one or more of the steps shown in FIG. 7 may be omitted, repeated, and/or performed in a different order. Accordingly, embodiments of the invention should not be considered limited to the specific arrangement of steps shown in FIG. 7.

In Step 702, packets are received by the physical network interface (110 in FIG. 1). In Step 704, a VNIC (i.e., the VNIC from which the packets are destined) is selected using the destination addresses (e.g., IP addresses) in the packets. In embodiment of the invention, a virtual switching table (302 in FIG. 3) in the network express manager (108 in FIG. 1) is used to determine the VNIC associated with the destination address. In Step 706, the packets are placed in the receive ring corresponding to the VNIC. In one embodiment of the invention, the receive ring corresponds to a buffer (or set of buffers) in the network express manager. In one embodiment of the invention, the network express manager may include multiple receive rings, where each receive ring is associated with a different VNIC, In Step 708, the VNIC determines that there are packets in the receive ring. In one embodiment of the invention, an interrupt is issued to the blade (i.e., the blade hosting the VNIC) after the packets are placed in the receive ring. In such cases, the receipt of the interrupt signals the VNIC that there are packets in the receive ring. In another embodiment of the invention, the VNIC (or a related process) periodically polls the network express manager to determine whether there are packets in the receive ring (i.e., the receive ring with which it is associated). If packets are present in the receive ring, the network express manager (in response to the polling) issues a response to the VNIC (or the related process), which reflects the presence of the packets in the receive ring.

In Step 710, the VNIC (or a related process) provides guest OS receive descriptors to the network express manager. In one embodiment of the invention, each of the receive descriptors includes a pointer to previously allocated memory in the guest OS memory (i.e., a pointer to a memory location in the guest OS memory). In one embodiment of the invention, the memory location may correspond to virtual memory location or a physical memory location. In one embodiment of the invention, the VNIC (or a related process) obtains receive descriptors from the guest OS prior to Step 710. In one embodiment of the invention, the guest OS may provide the VNIC with a number of receive descriptors based on the performance required by the guest OS. For example, the guest OS may provide 128 or 256 receive descriptors. However, if the guest OS requires a higher level of performance, the guest OS may provide a larger number of receive descriptors. Further, in one embodiment of the invention, the size of the memory associated with each receive descriptor is the size of a packet. However, the size of the receive descriptors may be larger than the size of a packet.

In one embodiment of the invention, the number of receive descriptors communicated from the VNIC to the guest OS may be based on one or more of the following factors: (i) number of available receive descriptors; (ii) number of packets in the receive ring; and (iii) whether the host OS is enforcing bandwidth control to the guest OS. With respect to (iii), if the host is implementing bandwidth control, then the network express manager will only be provided with a number of receive descriptors corresponding to the available bandwidth of the guest OS (difference between maximum bandwidth allocated to the guest OS and bandwidth currently being used by the guest OS).

In Step 712, the packets are transferred from the receive ring directly to the guest OS memory using the receive descriptors. In one embodiment of the invention, a direct memory access (DMA) mechanism is used to transfer the packets to the guest OS. In one embodiment of the invention, the packets are transferred to the guest OS kernel memory.

In Step 714, the guest OS is notified (by the host OS) that packets are present in the guest OS memory. In Step 716, the packets are processed by the guest OS. In one embodiment of the invention, processing the packets includes moving the packets from the guest OS memory associated with the receive descriptors to another portion of the guest OS memory. Alternatively, processing the packets includes removing the packets from the guest OS memory associated with the receive descriptors. In Step 718, after the guest OS has processed the packets, the receive descriptors used in Step 712 are released (i.e., available to be re-used by the network express manager).

FIG. 8 shows an example in accordance with one or more embodiments of the invention. The example in FIG. 8 is not intended to limit the scope of the invention. Turning to the example, initially packets (P1) are received by the physical network interface (800). The packets (P1) are sent to the network express manager (802), which uses the virtual switching table (804) and the destination address in the packets (in this example the destination address corresponds to the IP address associated with the VNIC (816)) to place the packets in the corresponding receive ring (808). The VNIC (816) is also associated with a transmit ring (806), which is used to send outbound network traffic from the VNIC (816) to the physical network interface (800).

Continuing with the example, an interrupt (S1) is issued to the VNIC (816) once the packets are placed in the receive ring (808). The VNIC (816), in response to the S1, sends receive descriptors (S2) to the network express manager. In this example, the host OS (814) is enforcing bandwidth control between receive ring (808) and the guest OS (818). Accordingly, the number of receive descriptors provided to network express manager is limited by the available bandwidth. The network express manager (802) subsequently transfers the packets (P2) (or at least a number of packets corresponding to the number of receive descriptors provided by the host OS) to the guest OS memory (820). The aforementioned transfer bypasses the host OS memory (822).

In one embodiment of the invention, after the packets have been transferred to the guest OS memory (820), the host OS (814) signals (S2) the guest OS (818) that packets for the guest OS (818) are present in the guest OS memory (820). Once the guest OS memory (820) processes the packets, the guest OS (818) sends a signal to the host OS (814) to release the receive descriptors associated with the processed packets.

In one embodiment of the invention, the host OS (814) and the guest OS (818) are instances of the same operating system (though not necessarily the same version of the operating system). For example, the host OS (814) may be Solaris™ OS version 9 and the guest OS (818) may be Solaris™ OS version 10.

Those skilled in the art will appreciate that while not explicitly shown all communication between the network express manager (and component executing thereon) and the blade (and components executing thereon) is communicated over the chassis interconnect (810).

Those skilled in the art will also appreciate that signals S1-S4 may corresponds to any known communication mechanism capable of communication the information described above with respect to signals S1-S4.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transferring a packet, comprising:
receiving the packet by a physical network interface, wherein the packet comprises a destination address, wherein the destination address corresponds to a first Internet Protocol (IP) address for a virtual network interface card (VNIC);
determining a VNIC physical location using the destination address and a virtual switching table (VST), wherein the VST is located on a physical network express manager (NEM),
wherein the VNIC is located on a computer operatively connected to the NEM via a chassis interconnect, and the VNIC is executing on a host operating system (OS) in the computer,
wherein the chassis interconnect comprises a Peripheral Component Interface Express (PCI-E) backplane, and
wherein the VST comprises an association between the first IP address, and the VNIC physical location comprising a PCI-E endpoint on the PCI-E backplane;
transferring the packet to a receive ring (RR) associated with the VNIC, wherein the RR is located on the NEM;
determining, by the VNIC, that the packet is in the RR;
providing the NEM with a receive descriptor, wherein the receive descriptor is a pointer to a memory location in a guest OS memory associated with a guest OS executing on the host OS;
transferring the packet to the guest OS memory from the RR in the NEM using the receive descriptor; and
notifying the guest OS that the packet is in the guest OS memory.

2. The method of claim 1, further comprising:
processing the packet by the guest OS; and
releasing, after the processing, the receive descriptor by the guest OS.

3. The method of claim 1, wherein the VNIC is configured to regulate the rate at which the packets are transferred to the guest OS from the network express manager.

4. The method of claim 1, wherein the guest OS and the host OS are instances of the same operating system.

5. The method of claim 1, wherein determining that the packet is in the RR comprises receiving an interrupt by the computer from the NEM.

6. The method of claim 1, wherein determining that the packet is in the RR comprises polling the RR by the computer to determine whether packets are present in the RR.

7. The method of claim 1, wherein the computer is a blade.

8. A system comprising:
a computer comprising:
a host operating system (OS) executing a virtual network interface card (VNIC);
host OS memory associated with the host OS;
a guest OS executing on the host OS;
guest OS memory associated with the guest OS;
a physical network express manager (NEM) comprising a physical network interface, a virtual switching table (VST), a receive ring (RR) associated with the VNIC;
a chassis interconnect configured to communicatively couple the computer and network express manager and comprising a Peripheral Component Interface Express (PCI-E) backplane;
wherein the NEM is configured to:
receive the packet from the physical network interface, wherein the packet comprises a destination address, wherein the destination address corresponds to a first Internet Protocol (IP) address for the VNIC;
determine a VNIC physical location using the destination address and the VRT, wherein the VST comprises an association between the first IP address, and the VNIC physical location comprising a PCI-E endpoint on the PCI-E backplane,
transfer the packet to a receive ring (RR) associated with the VNIC, wherein the RR is located on the NEM;
wherein the host OS is configured to:
determine that the packet is in the RR;
provide the NEM with a receive descriptor, wherein the receive descriptor is a pointer to a memory location in the guest OS memory;
wherein the NEM is further configured to:
transfer the packet to the guest OS memory from the RR in the NEM using the receive descriptor; and
wherein the host OS is further configured to notify the guest OS that the packet is in the guest OS memory.

9. The system of claim 8, wherein the guest OS is configured to:
process the packet after receiving notification that the packet is in the guest OS memory; and
release, after the processing, the receive descriptor.

10. The system of claim 8, wherein the VNIC is configured to regulate the rate at which the packets are transferred to the guest OS from the network express manager.

11. The system claim 8, wherein the guest OS and the host OS are instances of the same operating system.

12. The system of claim 8, wherein determining that the packet is in the RR comprises receiving an interrupt by the computer from the NEM.

13. The system of claim 8, wherein determining that the packet is in the RR comprises polling the RR by the computer to determine whether packets are present in the RR.

14. The system of claim 8, wherein the computer is a blade.

15. A non-transitory computer readable storage medium comprising a plurality of executable instructions for transferring a packet, wherein the plurality of executable instructions comprises instructions to:
receive the packet by a physical network interface, wherein the packet comprises a destination address, wherein the destination address corresponds to a first Internet Protocol (IP) address for a virtual network interface card (VNIC);
determine a VNIC physical location using the destination address and a virtual switching table (VST), wherein the VST is located on a physical network express manager (NEM),
wherein the VNIC is located on a computer operatively connected to the NEM via a chassis interconnect, and the VNIC is executing on a host operating system (OS) in the computer,
wherein the chassis interconnect comprises a Peripheral Component Interface Express (PCI-E) backplane, and
wherein the VST comprises an association between the first IP address, and the VNIC physical location comprising a PCI-E endpoint on the PCI-E backplane;
transfer the packet to a receive ring (RR) associated with the VNIC, wherein the RR is located on the NEM;
determine, by the VNIC, that the packet is in the RR;
provide the NEM with a receive descriptor, wherein the receive descriptor is a pointer to a memory location in a guest OS memory associated with a guest OS executing on the host OS;
transfer the packet to the guest OS memory from the RR in the NEM using the receive descriptor; and
notify the guest OS that the packet is in the guest OS memory.

16. The non-transitory computer readable storage medium of claim 15, wherein the plurality of executable instructions further comprises instructions to:
process the packet by the guest OS; and
release, after the processing, the receive descriptor by the guest OS.

17. The non-transitory computer readable storage medium of claim 15, wherein the VNIC is configured to regulate the rate at which the packets are transferred to the guest OS from the network express manager.

18. The non-transitory computer readable storage medium of claim 15, wherein the guest OS and the host OS are instances of the same operating system.

* * * * *

UNITED STATES PATENT AND TRADEMARK OFFICE
CERTIFICATE OF CORRECTION

| | | |
|---|---|---|
| PATENT NO. | : 8,886,838 B2 | Page 1 of 1 |
| APPLICATION NO. | : 12/040101 | |
| DATED | : November 11, 2014 | |
| INVENTOR(S) | : Tripathi et al. | |

It is certified that error appears in the above-identified patent and that said Letters Patent is hereby corrected as shown below:

Title Page

On page 2, column 1, under Other Publications, line 2, delete "Architectual" and insert -- Architectural --, therefor.

On page 2, column 2, under Other Publications, line 4, delete "pges." and insert -- pages. --, therefor.

In the Drawings

On sheet 5 of 8, in figure 6B, under Reference Numeral 638, line 1, delete "Vitual" and insert -- Virtual --, therefor.

In the Specification

In column 5, line 11, delete "or and" and insert -- or/and --, therefor.

In column 5, lines 13-14, delete "or and" and insert -- or/and --, therefor.

In column 5, line 17, delete "and/or and" and insert -- and/or --, therefor.

In column 8, line 31, delete "though" and insert -- thought --, therefor.

In column 10, line 19, delete "VNIC," and insert -- VNIC. --, therefor.

In the Claims

In column 13, line 53, in Claim 11, delete "system" and insert -- system of --, therefor.

Signed and Sealed this
Twenty-third Day of June, 2015

Michelle K. Lee
*Director of the United States Patent and Trademark Office*